United States Patent [19]

Young

[11] 4,087,764

[45] May 2, 1978

[54] GASEOUS THIN FILM ACOUSTICALLY TUNED LASER

[75] Inventor: Robert A. Young, Chatsworth, Calif.

[73] Assignee: Xonics, Inc., Van Nuys, Calif.

[21] Appl. No.: 675,165

[22] Filed: Apr. 8, 1976

[51] Int. Cl.² .............................................. H01S 3/10
[52] U.S. Cl. .......................... 331/94.5 M; 331/94.5 C; 331/94.5 G
[58] Field of Search .................... 331/94.5 C, 94.5 D, 331/94.5 M, 94.5 G; 350/96 WG, 161 W; 310/8.1, 9.8; 330/4.3

[56] References Cited

U.S. PATENT DOCUMENTS

| | | | |
|---|---|---|---|
| 2,753,543 | 7/1956 | Rymes | 310/26 |
| 3,166,673 | 1/1965 | Vickery et al. | 331/94.5 M |
| 3,469,207 | 9/1969 | Solomon et al. | 331/94.5 D |
| 3,772,611 | 11/1973 | Smith | 350/96 WG |
| 3,873,858 | 3/1975 | Burke et al. | 310/8.1 |
| 3,970,959 | 7/1976 | Wang et al. | 331/94.5 C |

*Primary Examiner*—William L. Sikes
*Assistant Examiner*—Marcus S. Rasco

*Attorney, Agent, or Firm*—Harris, Kern, Wallen & Tinsley

[57] ABSTRACT

A thin film laser typcially operating in the region of 1,000 to 10,000 A. First and second electrodes are mounted in a fluid container in spaced relation with a dielectric block in the gap between the electrodes and fixed to the first electrode. A voltage pulse applied to the electrodes produces an electric field between the electrodes with a discharge occurring in the thin film of fluid between the dielectric and second electrode. The current discharge excites the fluid, forming simple excited molecules which may have a bound upper state and a dissociative lower state connected by an optical transition. The surfaces of the block and second electrode may form an active optical wave guide for the excited molecules, in which lasing occurs. The laser may be tuned by an acoustic wave produced at the surface of the dielectric block which causes distributed feedback in the active region recycling potential laser emission through the active medium and turning the laser to a wavelength that matches the wavelength of the acoustic surface wave.

20 Claims, 9 Drawing Figures

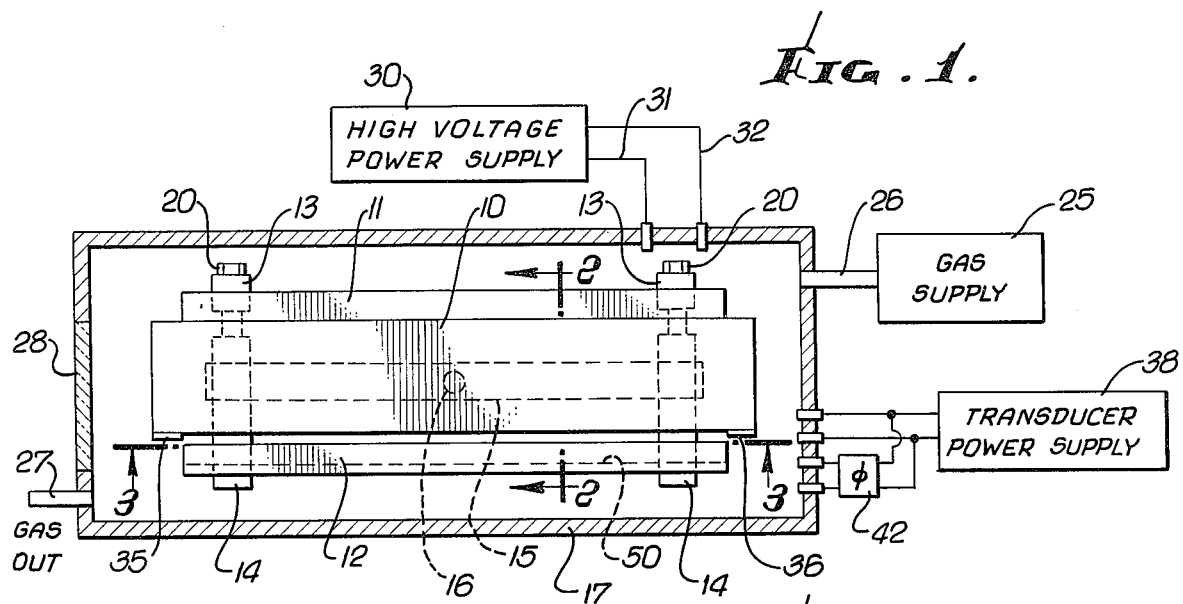
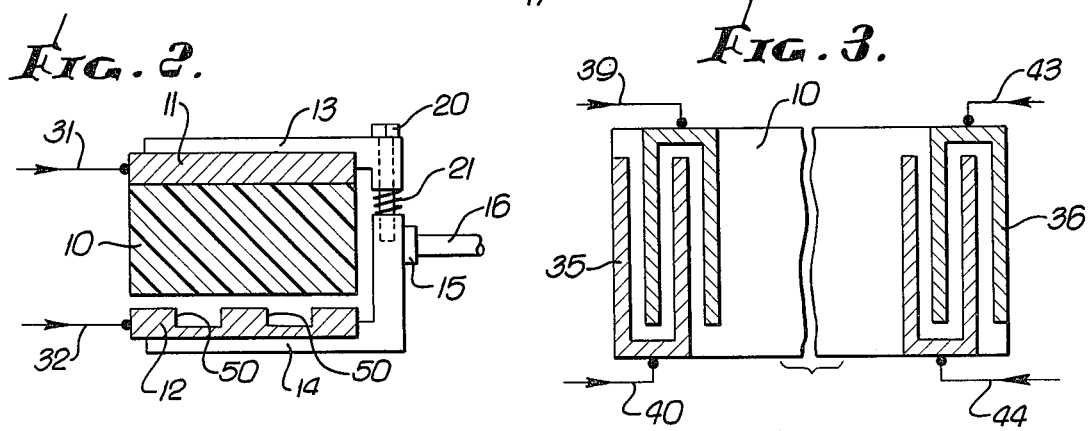
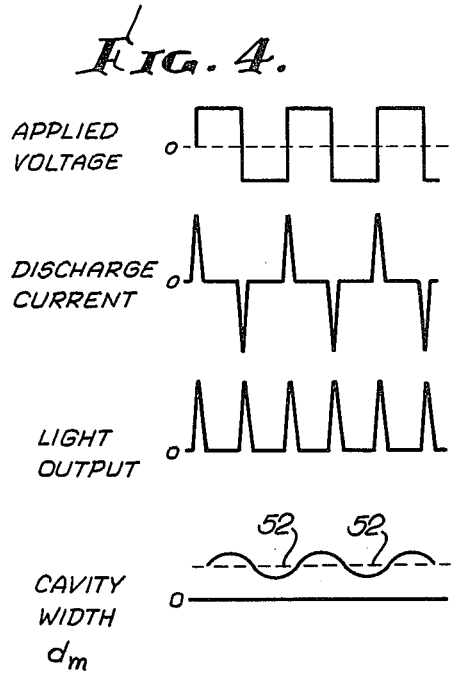
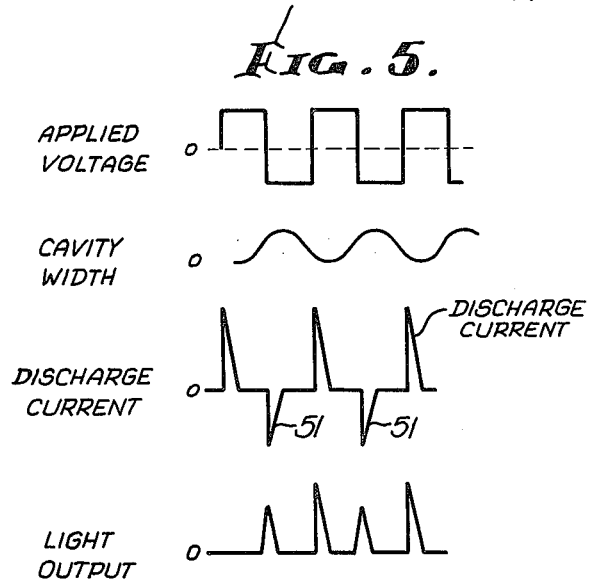

GASEOUS THIN FILM ACOUSTICALLY TUNED LASER

BACKGROUND OF THE INVENTION

This invention relates to thin film lasers and is an improvement on the type of laser shown in U.S. Pat. No. 3,760,292. The laser of the present invention uses electric discharge excitation which is facilitated by the incorporation of an electrostrictive high dielectric coefficient element in the electrical circuit to enhance peak excitation, limit excitation to a thin film, and facilitate mixing of the lasing medium and dissipation of energy and discharge products. The preferred embodiment incorporates a gaseous thin film the active medium of which utilizes small molecules as disclosed in my co-pending applications Ser. No. 586,273, now U.S. Pat. No. 4,002,922, entitled Vacuum Ultraviolet Continuum Lamps and Ser. No. 586,374, now abandoned, entitled The Use Of Surface Acoustic Waves To Tune A Thin Film Laser.

The thin film laser of the present invention is expected to have its greatest use in producing laser radiation in the 1,000 A to 10,000 A region. Present dye lasers do not operate, and could not operate in the region below 4,000 A, without destruction of the dye. Dye lasers use optical pumping means. In contrast, the laser of the present invention utilizes electrical discharge excitation of molecules, particularly although not limited to, molecules the ground state of which is unbound so the unexcited molecule is instable ($Kr_2$) or stable molecules with transitions to an unstable state ($H_2(b^3\Sigma^+)$). High pressure, typically in the range of 100 torr to 10,000 torr is preferred so that collisional processes dominate most radiative processes other than those utilized for laser operation.

SUMMARY OF THE INVENTION

The preferred embodiment of the thin film laser utilizes an electrostrictive dielectric between metal electrodes. One surface of the dielectric is bonded to one of the electrodes, with the other surface spaced from the other electrode defining a thin film space for the lasing medium. An electric field is produced between the metal electrodes and a discharge occurs in the thin film of gas in the space between the dielectric and the metal electrode. The discharge excites the gas, forming simple excited molecules which may have a bound upper state and dissociative lower state connected by an optical transition. The excited gas and the surfaces of the dielectric and electrode may form an active optical waveguide in which lasing occurs. The surface of the metal electrode may be grooved to facilitate flow of gas between the dielectric and the metal electrode. Acoustic surface waves may be excited in the dielectric at the surface of the wave guide to cause distributed feedback in the active region thus recycling potential laser emission through the active medium and tuning the laser to a wavelength that matches the acoustic surface wavelength.

BRIEF DESCRIPTION OF THE DRAWINGS

FIG. 1 is a side view, partly in section, of a thin film laser incorporating the presently preferred embodiment of the invention;

FIG. 2 is a sectional view taken along the line 2—2 of FIG. 1;

FIG. 3 is a sectional view taken along the line 3—3 of FIG. 1;

FIG. 4 is a diagram illustrating the operation of the laser of FIG. 1;

FIG. 5 is a diagram similar to that of FIG. 4 illustrating an alternative mode of operation of the laser of FIG. 1;

DESCRIPTION OF THE PREFERRED EMBODIMENTS

Figure 6:
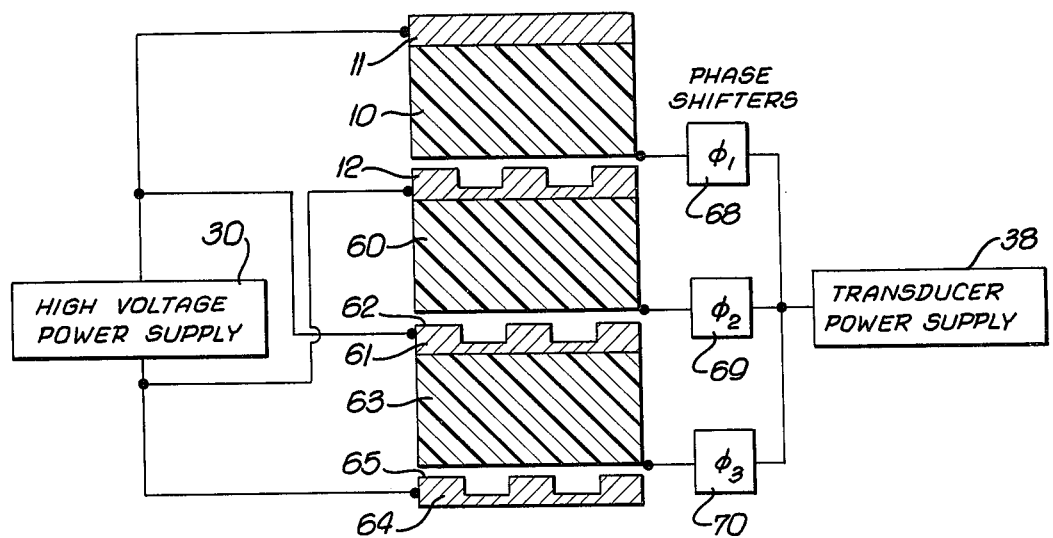
FIG. 6 is a view similar to that of FIG. 2 illustrating an alternative embodiment with a plurality of lasers stacked.

Referring to FIGS. 1 and 2, a dielectric block 10 is bonded to a metal electrode 11. The electrode 11 and another electrode 12 are supported in spaced relation, typically from two sets of brackets 13, 14 carried on a bar 15 supported on a post 16 from the sidewall of a container 17. In the preferred embodiment, means are provided for varying the spacing between the electrodes and typically may comprise a screw 20 which when advanced moves the bracket 13 toward the bracket 14, with a spring 21 disposed about the screw between the brackets for urging the brackets apart. The lasing medium, typically a gas from a gas supply 25 is introduced into the container via line 26. A gas outlet line 27 may be provided if desired. A window 28 is provided in one end of the container providing for passage of the laser beam output. A high voltage pulsed power supply 30, such as a charged Blum line and trigger is connected across the electrodes 11, 12 via leads 31, 32. In the preferred embodiment of the laser, an acoustic surface wave is generated at the surface of the block 10 facing the electrode 12. Acoustic transmitter and receiver in the form of interdigital transducers 35, 36 may be mounted on the surface of the block 10 adjacent each end. A transducer power supply 38 is connected to the transducer 35 via lines 39, 40. A termination impedence may be connected across the transducer 36, but it is preferred to connect the power supply 38 to the transducer 36 through a phase shifter 42 and leads 43, 44. By controlling the difference in phase of the signals at the transducers 35, 36, the operator can control the wave at the surface of the dielectric block 10.

Grooves 50 may be provided in the face of the electrode 12 at the gap. These grooves provide flow paths for the gas into and out of the gap during operation. The dielectric block 10 preferably is made of an electrostrictive material, that is, a material which exhibits strain when an electric field is applied, ferroelectric and piezoelectric materials are electrostrictive. Typical materials for the block 10 include barium titanate and lithium niobate.

In operation, voltage pulses are applied across the electrodes, as shown in the upper curve of FIG. 4. When the voltage is applied, the electrostrictive dielectric block will change its dimensions, producing a change in the width of the cavity or gap between the block 10 and electrode 12, as shown in the lower curve of FIG. 4. The high electric field in the gap resulting from the applied voltage produces an electrical discharge in the gas in the gap and excites states of the gas molecules. The discharge current in the gap is shown in the second curve of FIG. 4, with a discharge current for each polarity change of the applied voltage. The large discharge currents are self quenching as soon as the polarization charge on the dielectric is nullified by current flow in the gas. These discharge currents excite the gas in the cavity, causing a population inversion and lasing in the long dimension of the discharge cavity.

When no voltage is applied across the electrodes, the separation between the block 10 and electrode 12, that is, the width of the gap, is determined by the adjustment of the screws 20, with this width indicated by the horizontal dashed line 52 in FIG. 4. Typical spacings may be in the order of 0 to 1 millimeter. With the application of the bipolar voltage, which changes more rapidly than the dielectric can mechanically respond, the dielectric block changes dimension, increasing the gap width. The gap width may be set at a predetermined amount as shown in the curve of FIG. 4, or at zero with the block 10 engaging the electrode 12, as shown in the curve of FIG. 5.

The lasing medium preferably includes at least one rare gas so as to form excited diatonic gas molecules containing at least one rare gas, such as for example $Ar_2^*$, $ArKr^*$, $ArXe^*$, $ArCl^*$, $ArO^*$, $Kr_2^*$, $Xe_2^*$, $He_2^*$, $KrXe^*$, $HeAr^*$, $HeKr^*$ and $HeXe^*$. Also, other stable molecules such as $N_2$, $CO_2$ and $H_2$ may be mixed with a rare gas.

The laser as shown in FIGS. 1–3 has no reflective cavity to recirculate potential laser radiation and has no means of selecting the wavelength at which lasing may occur, except wavelengths that the propagation characteristic of the waveguide structure and gain profile of the medium may determine. Hence the laser may operate in an untuned mode. However it is ordinarily preferred to operate in a tuned mode at a known frequency. In the preferred embodiment illustrated, distributed feedback is introduced by exciting surface acoustic waves on the dielectric block at the cavity. This distributed feedback provides for recirculation of potential laser radiation through the active region and determines the wavelength within the gain profile of the medium. The acoustic surface wave in the dielectric block introduces a periodic change in the propagation characteristics of the waveguide and introduces a periodic change in the gain of the active medium, both of which induce lasing to occur with an optical wavelength equal to the acoustic wavelength. By the coupling of optical waves travelling in opposite direction in the active medium, laser radiation is recirculated through the active medium thereby producing the equivalent of a laser cavity with a strong wavelength dependent reflectivity. This is achieved without the need to compensate for the general deterioration of reflectivity and transmission of real materials in the ultraviolet and vacuum ultraviolet region of the optical spectrum.

Although by its nature, the thin film laser is not continuously lasing, its emission retains its phase coherence from pulse to pulse if during each pulse, the optical radiation is phase coherent with the continuously operating tuning acoustic surface wave. Hence the train of pulses produced will have many of the properties of a continuous laser.

When the width between the block 10 and electrode 12 is initially set at zero, as illustrated in FIG. 5, a special mode of operation is possible. The application of the high voltage pulse produces separation between the block and electrode resulting in the gap, as shown in the second curve of FIG. 5. Lasing occurs when the applied voltage changes from negative to positive, because at this point the largest peak current flows in the gas which has been compressed to a high density. After the gas has lased, the separation between the dielectric block and the electrode diminishes to zero, expelling the gas and cooling the dielectric surface by contact with the metal electrode. As the block and electrode separate, a weak current discharge may occur (pulses 51 in FIG. 5) so as to reduce the field between these elements and neutralize the polarization charge on the dielectric. This discharge may produce weak lasing. The polarization charge should be neutralized at contact of the block and electrode if it has not already been reduced to zero by the discharge across the gap. When the applied voltage changes from positive to negative, the gas in the gap is less dense than during the previous compression stroke and the discharge is less intense and lasing may not occur. The very large currents that occur at the times the applied voltage changes polarity do not degenerate into localized arcs because the dielectric block 10 will not permit currents along its surface and because surface charge neutralization occurs in a very short time. The electrode structure is embedded within the lasing medium in the container 17 and the current discharge occurs only through a very small portion of the medium, which is being continuously mixed. The lasing medium does not deteriorate because of the current discharge.

The maximum separation $dm$ between the metal electrode and the dielectric block caused by the electrostriction of the dielectric is proportional to the electric field E and width $w$ of the dielectric separating the metal electrodes. Since, for a planar geometry, $E = v/w$, where $v$ is the electrical potential applied to the metal electrodes, we find $dm$, the separation of the free dielectric surface from the opposite metal electrode, is proportional to $v$ and so is independent of $w$. However, the surface polarization charge density $\sigma_i$ and the compensating free change density $\sigma_f$ stored in the capacitor of capacitance C, formed by the metal-dielectric sandwich, are both inversely proportional to $w$ and directly proportional to the dielectric coefficient $Ke$ of the dielectric, at fixed $v$. The polarization charge density is $\sigma = Ke\Sigma_o E$, where $\Sigma_o = 8.95 \times 10^{-12}$ coulombs $^2$/newton meter. Using barium titanate as the electrostrictive dielectric material, one finds that $dm/w \approx 10^{-6}E$. For $v = 10^3$ volts, $w = 1$ mm and $Ke \approx 4 \times 10^3$, $dm = 10^{-2}$ mm and $\sigma_i \approx 3 \times 10^{-5}$ coulombs/cm$^2$ or $10^{15}$ electrons/cm$^2$ giving a stored energy of $3 \times 10^{-2}$ Joules/cm$^2$m capable of producing $\approx 10^{16}$ ions/cm$^2$, during the discharge, giving an ion density of at least $10^{19}$ ions/cm$^3$ which would be converted into approximately the same number of excited molecules which would be more than sufficient to produce a laser even if the discharge region was only 1 cm long. $dm$ is the separation of the free dielectric surface from the opposite metal electrode.

If the device employed 1 cm$^2$ of discharge structure and operated with an applied voltage wth a frequency of 100 Hz, this would correspond to an input of 1 watt and, at 10% efficiency, as is expected for rare gas dissociative lasers, an output of 100 milliwatts, and peak power of $\approx 10^7$ watts.

Figure 7:
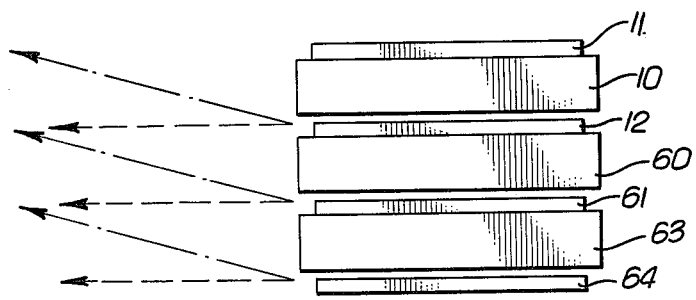
FIG. 7 is a view illustrating the operation of the stack of FIG. 6.

An alternative embodiment comprising a stack of lasers is shown in FIG. 6, where components corresponding to those of the laser of FIGS. 1–3 are identified by the same reference numerals. Another dielectric block 60 is bonded to the electrode 12 at one face. Another metal electrode 61 is positioned opposite the other face of the block 60 to form a second cavity 62. Another block 63 is bonded to the electrode 61, with another electrode 64 spaced from the block 63 to provide another cavity 65. The high voltage supply 30 is connected across alternate electrodes. The acoustic surface wave may be generated at each of the dielectric blocks in the same manner as in the embodiment of FIGS. 1–3. The transducer power supply 38 may be connected to each set of transducers in the same phase. However it is preferred to provide for introducing phase shift between the excitation for each laser and this may be accomplished by means of phase shifters 68, 69, 70 connected between the power supply and the transducers. The operation of the lasers of FIG. 6 may be the same as that described for the laser of FIGS. 1–3. Output beam steering and focusing may be accomplished by controlling the relative phases of the acoustic surface waves in each of the lasers. By way of illustration, FIG. 7 diagramatically illustrates a side view of the stack of FIG. 6. With the acoustic surface waves at the three lasers in phase, the outputs will be parallel and horizontal as indicated by the dash lines. With equal phase differences between the blocks 10 and 60, 60 and 63, and 63 and 10, the outputs will be parallel and at an angle, as shown by the dot-dash lines of FIG. 7.

Figure 8:
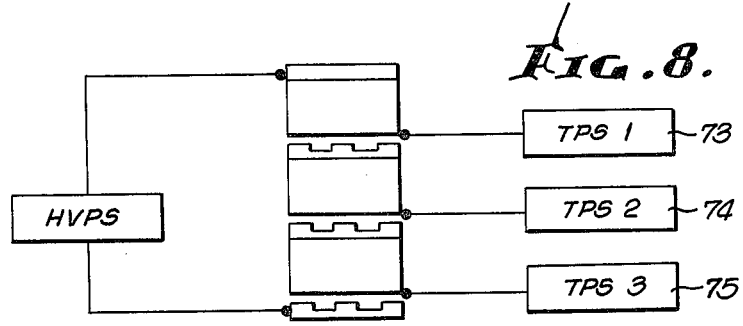
FIG. 8 is a view similar to that of FIG. 6 illustrating an alternative embodiment.

In another alternative embodiment as shown in FIG. 8, the acoustic wavelength at each dielectric block may be controlled separately using transducer power supplies 73, 74, 75. Otherwise the structure of FIG. 8 may be the same as the structure of FIG. 6. With this arrangement, optical beams of complex frequency can be formed.

Figure 9:
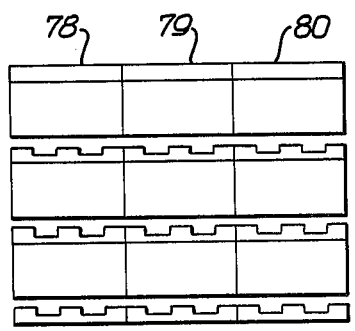
FIG. 9 is a view illustrating an array of stacked lasers.

A plurality of the stacks of FIG. 6 or FIG. 8 may be assembled in an array, as shown in FIG. 9 which comprises stacks 78, 79, 80. This configuration provides for steering the output beam along both x and y axes and can be used to carry out many of the functions of the electron beam-phosphor surface combination in creating visual displays.

I claim:

1. In a laser, the combination of:
first and second electrodes;
a container for a lasing fluid and including a laser beam output window;
means for mounting said electrodes in said container in spaced relation;
a dielectric block in the gap between said electrodes and fixed to said first electrode, said dielectric block being an electrostrictive material whereby the distance between said block and second electrode varies with an applied voltage across said electrodes, varying in a direction perpendicular to the lasing direction; and
means for connecting an electric power supply to said electrodes providing voltage pulses across said electrodes,
with an applied voltage at said electrodes causing an electric field between said dielectric block and second electrode, with the resulting discharge current exciting molecules of the fluid.

2. A laser as defined in claim 1 wherein said means for mounting includes means for adjusting the distance between said block and second electrode.

3. A laser as defined in claim 1 wherein said block and second electrode have substantially flat opposing faces, with a plurality of grooves in said face of said second electrode.

4. A laser as defined in claim 1 including:
a third electrode;
means for mounting said third electrode in said container in spaced relation with said second electrode; and
a second dielectric block in the gap between said second and third electrodes and fixed to said second electrode.

5. A laser as defined in claim 1 wherein said block and electrodes are substantially flat with said block and second electrode defining a cavity therebetween of less than a millimeter width providing an optical wave guide.

6. A laser as defined in claim 1 including a gas in said container at a pressure from about 100 to 10,000 torr.

7. A laser as defined in claim 1 wherein said dielectric block is barium titanate.

8. A laser as defined in claim 1 including a single rare gas in said container.

9. A laser as defined in claim 1 including a mixture of two rare gases in said container.

10. A laser as defined in claim 1 including a mixture of at least one rare gas and at least one of hydrogen, oxygen, halogen and nitrogen in said container.

11. A laser as defined in claim 1 including means for producing an acoustic wave at the surface of said block facing said second electrode.

12. A laser as defined in claim 11 wherein said wave producing means includes an interdigital transducer adjacent each end of said block, and means for connecting an ac power supply to at least one of said transducers.

13. A laser as defined in claim 12 including means for varying the phase of the ac supply at one of said transducers with respect to the phase of the ac supply at the other of said transducers.

14. A laser as defined in claim 4 including means for producing an acoustic wave at the surface of said one block facing said second electrode and at the surface of said second block facing said third electrode.

15. A laser as defined in claim 14 including means for varying the phase of the acoustic wave at the surface of said one block with respect to the phase of the acoustic wave at the surface of said second block.

16. A laser as defined in claim 14 wherein the assembly of said first, second and third electrodes and one and second blocks comprises a unit, and including a plurality of such units in side by side arrangement.

17. A method of operating a laser having first and second spaced electrodes in a fluid container, with an electrostrictive dielectric block between the electrodes and fixed to the first electrode and movable relative to the second electrode, including the step of cyclicly varying in a direction perpendicular to the lasing direction, the distance between the block and second electrode by applying a cyclical voltage to the electrodes.

18. The method as defined in claim 17 including cyclically moving the block into contact with the second electrode.

19. The method of claim 17 including tuning the laser by generating an acoustic wave at the surface of the block facing the second electrode.

20. A method of operating a laser having first and second spaced electrodes in a fluid container, with an electrostrictive dielectric block between the electrodes and fixed to the first electrode and movable relative to the second electrode in a direction perpendicular to the lasing direction, including the step of tuning the laser by generating an acoustic wave at the surface of the block facing the second electrode.

* * * * *